United States Patent
Inatomi et al.

(12)
(10) Patent No.: US 6,173,677 B1
(45) Date of Patent: Jan. 16, 2001

(54) FLOOR MAT FOR LIVESTOCK

(75) Inventors: Shinichiro Inatomi; Hisao Nishinaka, both of Ohtsu (JP)

(73) Assignee: Toyobo Co., Ltd., Osaka (JP)

( * ) Notice: Under 35 U.S.C. 154(b), the term of this patent shall be extended for 0 days.

(21) Appl. No.: 09/314,381

(22) Filed: May 19, 1999

(30) Foreign Application Priority Data

May 22, 1998 (JP) .................................................. 10-141082

(51) Int. Cl.⁷ .................................................... A01K 1/015
(52) U.S. Cl. ............................................................. 119/526
(58) Field of Search .................................. 119/28.5, 526; 15/215; 52/660; 5/420; 428/17, 44, 67

(56) References Cited

U.S. PATENT DOCUMENTS

| | | | |
|---|---|---|---|
| 3,978,263 | * 8/1976 | Wellensick | 442/225 |
| 4,502,415 | * 3/1985 | Schwartzkopff et al. | 119/526 |
| 5,073,428 | * 12/1991 | Lancelot et al. | 428/67 |
| 5,685,257 | * 11/1997 | Feibus | 119/28.5 |
| 5,827,592 | * 10/1998 | Van Giluk et al. | 428/44 |
| 5,908,673 | * 6/1999 | Mulberger | 428/17 |
| 6,079,366 | * 6/2000 | Telleen | 119/526 |

FOREIGN PATENT DOCUMENTS

| | | |
|---|---|---|
| 7203792A | 8/1995 | (JP) . |
| 8149935A | 6/1996 | (JP) . |
| 9157111A | 6/1997 | (JP) . |

* cited by examiner

*Primary Examiner*—Charles T. Jordan
*Assistant Examiner*—Elizabeth Shaw
(74) *Attorney, Agent, or Firm*—Kenyon & Kenyon

(57) ABSTRACT

A floor mat for livestock, comprising a thermally bonded fiber mat layer having a surface hardness (Durometer hardness) of 60 to 98 by an F-type hardness tester and having a water permeability of not more than 120 seconds.

16 Claims, No Drawings

FLOOR MAT FOR LIVESTOCK

BACKGROUND OF THE INVENTION

1. Field of the Invention

The present invention relates to a floor mat for livestock such as cattle, and more particularly to a floor mat for livestock which has an excellent water permeability, which prevents livestock such as cattle from slipping thereon due to feces and urine of the livestock or due to water for washing away the feces and urine in cleaning, which prevents generation of mildews that are considered to be a cause of mammitis (breast inflammation) of the livestock, and which further has an antibacterial activity.

2. Description of the Related Art

Heretofore, a mat for livestock is used in a cowshed or on a mounting stage of a truck for transporting cattle. This is because, if livestock such as cattle slip, their legs tend to be hurt and a grave condition of the hurt may sometimes lead to death.

Therefore, various shapes such as unevenness are provided to increase the anti-slipping property of conventional floor mats for livestock. However, such floor mats for livestock have a complicated shape, so that feces and urine tend to be caught thereby and water for washing away the feces and urine tends to stay thereon, all the more leading to easy slippage of the livestock.

A floor mat for livestock that solves this problems is disclosed in Japanese Laid-open Patent Application No. 7-203792/1995. This floor mat for livestock is characterized in that plural streaks of grooves extending in the same direction are arranged in an upper surface of a flat plate-like mat body in a groove width direction perpendicular to the length direction of the grooves.

However, this floor mat for livestock has a disadvantage of high processing costs because the processing on the mat is complicated, and a disadvantage of large weight because the material used for the mat is a soft rubber or the like.

A floor mat endowed with gas permeability and water permeability is disclosed in Japanese Laid-open Patent Application No. 8-149935/1996. This floor mat for livestock is constructed with two (front and rear) layers of knitted textile and linking threads. This construction gives the gas permeability and the water permeability.

However, since this floor mat for livestock is made of a knitted textile, it is not possible to wash away the feces and urine completely from the inside of the fibers, so that it is difficult to prevent generation of mildews.

Therefore, an object of the present invention is to provide a floor mat for livestock which has an excellent water permeability, which prevents livestock such as cattle from slipping thereon due to feces and urine of the livestock or due to water for washing away the feces and urine in cleaning, which prevents generation of mildews that are considered to be a cause of mammitis (breast inflammation) of the livestock, and which further has an antibacterial activity.

SUMMARY OF THE INVENTION

In order to achieve the aforementioned object, the floor mat for livestock according to the present invention has the following construction. Namely, the characteristic feature of the floor mat for livestock according to the present invention is that it comprises a thermally bonded fiber mat layer with a surface hardness of 60 to 98 and a water permeability of not more than 120 seconds.

The surface hardness (Durometer hardness) according to the present invention is determined by an F-type hardness tester. The surface hardness of the thermally bonded fiber mat is 60 to 98, more preferably 80 to 95. When the livestock such as cattle sit down or stand up, two forelegs or hindlegs are loaded with the whole weight of the livestock. Therefore, if the surface hardness is less than 60, a problem of abrasion occurs due to claws of the livestock as the mat is used for a long period of time, so that it is not preferable.

The water permeability is not more than 120 seconds, preferably not more than 90 seconds, and more preferably not more than 60 seconds in accordance with the measurement method given in the following description. If the water permeability is more than 120 seconds, it is not preferable because the feces and urine or water for washing away the feces and urine stay on the mat, whereby mildews tend to be generated and bacteria tend to grow, leading to poor habitation environment for the livestock.

Thus, since the floor mat for livestock according to the present invention is composed of thermally bonded fiber mat having a specific surface hardness, it is safe as compared with a rubber sheet or a flat plate-like mat because the livestock do not slip thereon by washing water, and also it is not so heavy as a rubber sheet. The thermally bonded fiber mat of the present invention produces advantages that it has good gas permeability and water permeability and can keep cleanness because the feces and urine or the water for washing away the feces and urine in cleaning do not stay thereon.

The method for forming the thermally bonded fiber mat layer is not specifically limited as long as its surface hardness is not less than 60. However, it is preferable to thermoset the thermally bonded fiber mat layer. For example, it is possible to adopt a method in which webs made to pass through a card are stacked by a cross layer for thermosetting, a method in which webs are machine-interlocked by means of a needle punch for preventing exfoliation before thermosetting, or a method in which webs are stacked for thermosetting.

The fiber to be used in the thermally bonded fiber mat layer of the present invention may be any of natural fiber, inorganic fiber, regenerated fiber, or synthetic fiber, and is preferably a fiber mainly containing synthetic fiber such as polyester fiber or polyolefin fiber.

The synthetic fiber that constitutes the thermally bonded fiber mat layer of the present invention is not specifically limited. However, it is preferable to use a polyester staple fiber having a fineness of 1.5 to 100 deniers, preferably 2 to 20 deniers, and a fiber length of 10 to 100 mm, preferably 50 to 80 mm. If the fineness is less than 1.5 deniers or exceeds 100 deniers, or the cut length is less than 10 mm or exceeds 100 mm, the productivity in forming the webs or stack before forming the thermally bonded fiber mat tends to be poor.

The fiber for forming the thermally bonded fiber mat layer is preferably given crimps. The crimps are not specifically limited, but they are preferable in providing better card-passing property for forming the webs or web stack and better operability in forming the sheets. The method for giving crimps is not specifically limited, and it is possible to carry out an asymmetric cooling process in forming the threads for three-dimensional crimping or to carry out machine crimping. The number of crimps for providing better operability is 5 to 30 per inch, preferably 10 to 20 per inch, and the crimping degree is preferably 5 to 40%, more preferably 10 to 35%.

The fiber for forming the thermally bonded fiber mat layer may have a solid, hollow, or non-circular cross-sectional shape. The thermally bonded fiber mat layer preferably has a thickness of about 1 to 40 mm, more preferably 2 to 30 mm.

The thermally bonded fiber mat layer preferably has a mildew-proofing property and/or an antibacterial activity. This can prevent the mammitis of the cattle and the like with certainty.

The method for giving the mildew-proofing property or the antibacterial activity to the thermally bonded fiber mat layer may be a known method. In view of durability, however, it is preferable to use a mildew-proofing fiber or an antibacterial fiber obtained by allowing a fiber for thermally bonded fiber mat or a thermally bondable fiber to contain a mildew-proofing agent or an antibacterial agent in advance. The content of the mildew-proofing fiber and/or the antibacterial fiber in the thermally bonded fiber mat layer is 10 to 80% by weight, preferably 30 to 70% by weight.

The method for giving the mildew-proofing property and the antibacterial activity may be a method of compounding a mildew-proofing agent or an antibacterial agent at the time of spinning or a method of giving them by postprocessing after the thermally bonded fiber mat layer is formed. The method of incorporation is preferable because, by the postprocessing method, the mildew-proofing property and the antibacterial activity tend to decrease by washing away the feces and urine and cleaning with a mop at the time of cleaning. The fiber having a mildew-proofing property and an antibacterial activity is preferably a fiber containing a mildew-proofing agent such as thiazobenzimidazole, a fiber such as disclosed in Japanese Laid-open Patent Application No. 9-157111/1997, a fiber compounding a silver or zinc antibacterial agent therein, or the like.

If the content of the mildew-proofing fiber or the antibacterial fiber in the thermally bonded fiber mat layer is less than 10% by weight, the mildew-proofing property or the antibacterial activity tend to be insufficient, whereas if the content exceeds 80% by weight, the content of the thermally bondable fiber will be small and it may be impossible to obtain a sufficient surface hardness.

The thermally bonded fiber mat layer preferably contains 20 to 60% by weight, more preferably 20 to 40% by weight, of the thermally bondable fiber. This is because, although it depends on the heat processing condition in heat molding, it is difficult to ensure the hardness of the content is less than 20% by weight, whereas the gas permeability tends to be poor if the content exceeds 40% by weight, so that the gas permeability and the water immersion property tend to be poor.

The thermally bondable fiber is preferably a core-sheath type fiber with its sheath component being 30 to 70% by weight and having a melting point of 70 to 200° C.

For the thermally bonded fiber mat layer, it is also possible to use a thermally bondable fiber or a fiber for thermally bonded fiber mat obtained by incorporating a mildew-proofing agent or an antibacterial agent in the sheath component of the core-sheath type fiber.

It is preferable to provide reinforcement by allowing base cloth to be disposed between a plurality of the thermally bonded fiber mat layers. Namely, although the floor mat for livestock according to the present invention may be a thermally bonded fiber mat in which a plurality of webs are stacked and thermoset, it is possible to adopt a construction in which a plurality of thermally bonded fiber mat layers are stacked and, further, a base cloth is disposed between these layers for reinforcement. The floor mat for grown milk cows must have a length of nearly 2 m, so that there is a possibility that the floor mat bends when transported. Because of this, it is an effective means to interpose base cloth for reinforcement. The base cloth to be used here may be a woven fabric made of natural fiber, inorganic fiber, regenerated fiber, or synthetic fiber, or a film. In this case, the base cloth is selected so as to maintain a water permeability of not more than 120 seconds as a mat. The thickness of the mat is not specifically limited, but it is preferably 5 to 30 mm in view of the effects produced by the mat and the costs.

Further, the floor mat for livestock according to the present invention preferably has a mat cover made of a woven or knitted fabric having a mildew-proofing property and/or an antibacterial activity. This not only increases the durability of the floor mat for livestock considerably but also can prevent mammitis of the cattle and the like with more certainty.

DETAILED DESCRIPTION OF THE PREFERRED EMBODIMENTS

The present invention will be explained in detail with reference to embodiments. First, the methods for measuring the characteristics referred to in the present invention are as follows.

[Water permeability]

A sample cut to have a diameter of 89 mm is interposed between two cylinders made of stainless steel and having an outer diameter of 89 mm, an inner diameter of 78 mm, and a height of 74 mm so that water may not leak out from a connecting point. Pure water (200 ml) is poured within two seconds through an inlet of the upper cylinder, and water is sampled below to measure the period of time in which 195 ml of water passes.

[Surface hardness: Durometer hardness]

The hardness of surface of the sample is measured by means of an F-type hardness tester of an Asker rubber hardness tester made by Kobunshi Keiki Co., Ltd.

[Anti-abrasion property by a Taber shape method]

A Taber-type abrasion tester made by Yasuda Seiki Seisakusho Co., Ltd. is used, and an abrasion ring H-22 is disposed on a sample and rotated for 200 times with a load of 1000 g at a rotation number of 70 rpm. The weight of the sample is measured before and after the rotation to determine the amount of decrease. The fiber turned into pills after the abrasion is cut off with a pair of scissors.

[Mildew-proofing property]

A modified MIL STD 810D Method 508.3 is adopted, and the following 62 kinds of mixed mildews are used. The mildews are directly inoculated from a mixed spore suspension prepared by a wet method, and grown for 28 days in an potato dextrose agar medium (with not antibiotics such as PDA or chloramphenicol added) under the condition with a temperature of 30°C±5° C., a humidity of 95%±5% RH, and a wind speed of 60 cm/sec. The result is evaluated into the following five ranks.

0 . . . No growth of the mildews is confirmed.

1 . . . A slight growth of mildews is confirmed.

2 . . . A little growth of mildews is confirmed.

3 . . . A considerable growth of mildews is confirmed.

4 . . . An intense growth of mildews is confirmed.

The mildews used are as follows. Namely, they are *Nigrospora Orisee Cladosporium Regine, Cladosporium Helbarem, Cladosporium Cladosporioidus, Cladosporium Safaerosberama, Tricoderma Coningi,* Tricoderma T-1, *Tricoderma Bilidi, Forma Glomerata, Forma Therestius, Plu-* ralia Pulrans, Gliocladium Birens, Geotricum Lactus, Geotricum Candidum, Pestalocia Adasta, Pestalocia Neglecta, Mirotesium Fercalia, Arternalia Tenas, Arternalia Brassicola, Arternalia Arternata, Aspergirus Niger, Aspergirus Frebus, Aspergirus Fersicol, Aspergirus Orisee, Aspergirus Thereus, Aspergirus Fumigatus, Aureobasidium Pulrans, Fusarium Moniliforme, Fusarium Semitectum, Fusarium Purariferatum, Fusarium Roseum, Fusarium Solani, Fusarium Oxisporum, Lisopus Nigricans, Lisopus Stronifer, Penicilium Citrinum, Penicilium Icpansa, Penicilium Funiculosum, Penicilium Liracinum, Penicilium Nigricans, Penicilium Frequentus, Penicilium Citreobiliti, Mucol Racematus, Eurotium Tonafirum, Tricofeton Mentagrofites, Monilia Fulcutigana, Cetomium Grobosum, Epicoccum Purpurasens, Acremonium Charticola, Waremia Sebi, Candida Albicans, Streptofetesilium Reticarem, Saccharomyces Cerevisi, Bacilus Subtilis, Bacilus Megaterium, Stafirococcus Ore, Pseudomonus Erginossa, Pseudomonus Florescens, Salmonera Taifimarium, Eschericia Coli, Botoritis Cinerea*, and *Proteus Vulgaris*. These mildews are stock culture purely grown bacteria or subculture bacteria of not more than 30 days each preserved at 6° C.±4° C.

[Antibacterial activity]

The antibacterial activity was measured according to a manual for a method of quantitative antibacterial activity test of a fiber product as established by Council for Evaluation of New Property of Fiber Product. Namely, in a sterilized nutrient broth of 1/20 concentration $1\pm0.3\times10^5$/ml of the following test bacteria are inoculated uniformly into 0.4 g of a sample and grown at 37° C. for 18 hours. After the cultivation ends, the test bacteria are washed out and, with this liquid, a mixed diluted flat plate agarose culture medium is prepared and the bacteria are grown at 37° C. for 24 to 48 hours to measure the number of alive bacteria. Here, as to the unprocessed products, the test bacteria are washed out also immediately after the inoculation and, with this liquid, a mixed diluted flat plate agarose culture medium is prepared and the bacteria are grown at 37° C. for 24 to 48 hours to measure the number of inoculated alive bacteria. The antibacterial activity is evaluated by a bacteriostatic activity value according to the following formula. A higher bacteriostatic activity value represents a more excellent antibacterial activity. Here, Staphylococcus Aureus ATCC 6538P was used as the test bacteria.

Bacteriostatic activity value=$Log\ (B) - Log\ (C)$

Here, a test condition: Log (B)–Log (A)>1.5 must be satisfied.

A: Average number of bacteria collected immediately after the inoculation on an unprocessed product B: Average number of bacteria grown for 18 hours and collected from an unprocessed product C: Average number of bacteria grown for 18 hours and collected from a processed product Hereafter, the embodiments of the present invention will be explained together with comparative examples.

EXAMPLE 1

A polyester fiber (30% by weight) with a fineness of 6 deniers, a cut length of 76 mm, ten crimps per inch, a crimping degree of 23%, and a % of hollowness of fiber of 35% and incorporating 1% by weight of a mildew proofing agent containing 2,4,5,6-tetrachloroisophthalonitrile, sodium 2-pyridinethiol-1-oxide, 2,3,5,6-tetrachloro-4-methylsulfonylpyridine, N,N-dimethyl-N'-phenyl-N'-dichlorofluoromethylthiosulfamide, diiodomethyl-p-tolylsulfone, 2-(n-octyl)-4-isothiazolin-3-one, 2-(4-thiazolyl)-1H-benzoimidazole, and methyl 1H-2-benzoimidazole carbamate as effective components in the polyester fiber; a polyester fiber (35% by weight) with a fineness of 15 deniers, a cut length of 76 mm, ten crimps per inch, a crimping degree of 29%, and a % of hollowness of fiber of 35%; and a thermally bondable fiber (35% by weight) having a core-sheath structure with a core/sheath ratio of 50/50 and with the melting point of the sheath portion being 130° C. were blended to prepare a card web. This card web was stacked by a cross layer so that the weight per square meter might be 2000 g/m$^2$, and thermoset at 160° C. for 5 minutes to obtain a floor mat for livestock having a thickness of 10 mm. The evaluation result of this mat is shown in Table 1.

EXAMPLE 2

The same mildew-proofing polyester fiber (30% by weight) as in Example 1 except for the cut length of 64 mm; a polyester fiber (35% by weight) with a fineness of 15 deniers, a cut length of 76 mm, ten crimps per inch, a crimping degree of 29%, and a % of hollowness of fiber of 35%; and the same thermally bondable fiber (35% by weight) as in Example 1 were blended to prepare a card web. This card web was stacked by a cross layer so that the weight per square meter might be 600 g/m$^2$, thereby to obtain a web. The above mildew-proofing polyester fiber (20% by weight); a polyester fiber (45% by weight) with a fineness of 15 deniers, a cut length of 76 mm, ten crimps per inch, a crimping degree of 29%, and a % of hollowness of fiber of 35%; and the above thermally bondable fiber (35% by weight) were blended to prepare a card web. This card web was stacked by a cross layer so that the weight per square meter might be 1400 g/m$^2$, thereby to obtain a web. A polypropylene base cloth was interposed between these two webs, and a machine interlocking was given by a needle punch with a needle density of 552 needles per square inch, followed by thermosetting at 150° C. for 6 minutes to obtain a floor mat for livestock having a thickness of 10 mm. The evaluation result of this mat is shown in Table 1.

EXAMPLE 3

A polyester fiber (30% by weight) with a fineness of 6 deniers, a cut length of 76 mm, ten crimps per inch, a crimping degree of 23%, and a % of hollowness of fiber of 35%; a polyester fiber (35% by weight) with a fineness of 15 deniers, a cut length of 76 mm, ten crimps per inch, a crimping degree of 29%, and a % of hollowness of fiber of 35%; and a thermally bondable fiber (35% by weight) having a core-sheath structure with a core/sheath ratio of 50/50 and with the melting point of the sheath portion being 130° C. were blended to prepare a card web. This card web was stacked by a cross layer so that the weight per square meter might be 2000 g/m$^2$, and thermoset at 160° C. for 5 minutes to obtain a floor mat for livestock having a thickness of 10 mm. The evaluation result of this mat is shown in Table 1.

EXAMPLE 4

A polyester fiber (30% by weight) with a fineness of 6 deniers, a cut length of 76 mm, ten crimps per inch, a crimping degree of 23%, and a % of hollowness of fiber of 35%; a polyester fiber (40% by weight) with a fineness of 15 deniers, a cut length of 76 mm, ten crimps per inch, a crimping degree of 29%, and a % of hollowness of fiber of 35%; and a thermally bondable fiber (30% by weight)

having a core-sheath structure with a core/sheath ratio of 50/50 and with the melting point of the sheath portion being 130° C. were blended to prepare a card web. This card web was stacked by a cross layer so that the weight per square meter might be 600 g/m², thereby to obtain a web. Also, a polyester fiber (20% by weight) with a fineness of 6 deniers, a cut length of 64 mm, ten crimps per inch, a crimping degree of 23%, and a % of hollowness of fiber of 35%; a polyester fiber (45% by weight) with a fineness of 15 deniers, a cut length of 76 mm, ten crimps per inch, a crimping degree of 29%, and a % of hollowness of fiber of 35%; and a thermally bondable fiber (35% by weight) having a core-sheath structure with a core/sheath ratio of 50/50 and with the melting point of the sheath portion being 130° C. were blended to prepare a card web. This card web was stacked by a cross layer so that the weight per square meter might be 1400 g/m², thereby to obtain a web. A polypropylene base cloth was interposed between these two webs, and a machine interlocking was given by a needle punch with a needle density of 552 needles per square inch, followed by thermosetting at 150° C. for 6 minutes to obtain a floor mat for livestock having a thickness of 10 mm. The evaluation result of this mat is shown in Table 1.

COMPARATIVE EXAMPLE 1

A polyester fiber (30% by weight) with a fineness of 6 deniers, a cut length of 76 mm, ten crimps per inch, a crimping degree of 23%, and a % of hollowness of fiber of 35%; a polyester fiber (55% by weight) with a fineness of 15 deniers, a cut length of 76 mm, ten crimps per inch, a crimping degree of 29%, and a % of hollowness of fiber of 35%; and a thermally bondable fiber (15% by weight) having a core-sheath structure with a core/sheath ratio of 50/50 and with the melting point of the sheath portion being 130° C. were blended to prepare a card web. This card web was stacked by a cross layer so that the weight per square meter might be 1000 g/m², and thermoset at 160° C. for 5 minutes to obtain a floor mat for livestock having a thickness of 30 mm. The evaluation result of this mat is shown in Table 1.

COMPARATIVE EXAMPLE 2

A floor mat for livestock was obtained in the same manner as in Example 4 except that the polypropylene base cloth interposed between the two webs in Example 4 was changed to a polyester film. The evaluation result of this mat is shown in Table 1.

TABLE 1

|  | Water permeability (sec) | Surface hardness (F.) | Taber abrasion amount (g) | Mildew-proofing property |
| --- | --- | --- | --- | --- |
| Example 1 | 12 | 90 | 0.21 | 0 |
| Example 2 | 23 | 90 | 0.25 | 0 |
| Example 3 | 12 | 90 | 0.20 | 3 |
| Example 4 | 23 | 90 | 0.23 | 3 |
| Comparative Example 1 | 6 | 46 | 1.80 | 3 |
| Comparative Example 2 | >180 | 90 | 0.25 | 4 |

The Taber tests in Examples 2 and 4 were carried out by evaluating the abrasion property on the side with less mesh.

EXAMPLE 5

A fiber having antibacterial activity (50% by weight) obtained by giving 0.1% by weight of quaternary ammonium salt antibacterial agent (made by Dow Corning Corp., DC 5700) to a polyester fiber having a fineness of 6 deniers, a cut length of 76 mm, 10 crimps per inch, a crimping degree of 23%, and a % of hollowness of fiber of 35% and thermally treated at 160° C. for 2 minutes; a polyester fiber (15% by weight) with a fineness of 15 deniers, a cut length of 76 mm, ten crimps per inch, a crimping degree of 29%, and a % of hollowness of fiber of 35%; and a thermally bondable fiber (35% by weight) having a core-sheath structure with a core/sheath ratio of 50/50 and with the melting point of the sheath portion being 130° C. were blended to prepare a card web. This card web was stacked by a cross layer so that the weight per square meter might be 1000 g/m², and thermoset at 160° C. for 5 minutes to obtain a floor mat for livestock having a thickness of 10 mm. The evaluation result of this mat is shown in Table 2.

EXAMPLE 6

An antibacterial polyester fiber (50% by weight) obtained by incorporating 1% by weight of silver-A type zeolite particles having an average particle size of 1.1 µm and carrying 5% of silver as an antibacterial agent to a polyester fiber having a fineness of 6 deniers, a cut length of 64 mm, ten crimps per inch, a crimping degree of 23%, and a % of hollowness of fiber of 35%; a polyester fiber (15% by weight) with a fineness of 15 deniers, a cut length of 76 mm, ten crimps per inch, a crimping degree of 29%, and a % of hollowness of fiber of 35%; and a thermally bondable fiber (35% by weight) having a core-sheath structure with a core/sheath ratio of 50/50 and with the melting point of the sheath portion being 130° C. were blended to prepare a card web. This card web was stacked by a cross layer so that the weight per square meter might be 2000 g/m², and thermoset at 160° C. for 5 minutes to obtain a floor mat for livestock having a thickness of 10 mm. The evaluation result of this mat is shown in Table 2.

COMPARATIVE EXAMPLE 3

A polyester fiber (85% by weight) with a fineness of 6 deniers, a cut length of 76 mm, ten crimps per inch, a crimping degree of 23%, and a % of hollowness of fiber of 35%; and a thermally bondable fiber (15% by weight) having a core-sheath structure with a core/sheath ratio of 50/50 and with the melting point of the sheath portion being 130° C. were blended to prepare a card web. This card web was stacked by a cross layer so that the weight per square meter might be 1500 g/m², and thermoset at 160° C. for 5 minutes to obtain a floor mat for livestock having a thickness of 10 mm. The evaluation result of this mat is shown in Table 2.

EXAMPLE 7

A floor mat for livestock was obtained in the same manner as in Example 4 except that the hollow antibacterial fiber used in Example 6 was used. The evaluation result of this mat is shown in Table 2.

TABLE 2

|  | Water permeability (sec) | Surface hardness (F.) | Taber abrasion amount (g) | Bacteriostatic activity value |
| --- | --- | --- | --- | --- |
| Example 5 | 12 | 90 | 0.25 | 6.3 |
| Example 6 | 12 | 90 | 0.20 | 3.4 |

TABLE 2-continued

| | Water permeability (sec) | Surface hardness (F.) | Taber abrasion amount (g) | Bacteriostatic activity value |
|---|---|---|---|---|
| Example 7 | 23 | 90 | 0.23 | 3.4 |
| Example 3 | 6 | 46 | 1.80 | 0.3 |

The Taber test in Example 7 was carried out by evaluating the abrasion property on the side with less a weight per square meter.

EXAMPLE 8

A mat cover of tricot knitted textile (with a weight per square meter of 300 g/m$^2$) was obtained from a 40-count spun yarn composed of a polyester fiber (with a fineness of 3 deniers and a cut length of 76 mm) containing 1% by weight of the mildew-proofing agent used in Example 1 and a regular polyester fiber (with a fineness of 2 deniers and a cut length of 76 mm) at a ratio of 50/50.

This mat cover was mounted on the mat of Example 3 to evaluate the mildew-proofing property, with the result that the evaluated value was 0, showing an excellent mildew-proofing property.

EXAMPLE 9

A mat cover of tricot knitted textile (with a weight per square meter of 300 g/m$^2$) was obtained from a 40-count spun yarn composed of a polyester fiber (with a fineness of 3 deniers and a cut length of 76 mm) containing 5% by weight of the antibacterial agent used in Example 6 and a regular polyester fiber (with a fineness of 2 deniers and a cut length of 76 mm) at a ratio of 50/50.

This mat cover was mounted on the mat of Example 3 to evaluate the antibacterial activity, with the result that the bacteriostatic activity value was 3.3, showing an excellent antibacterial activity.

What is claimed is:

1. A floor mat for livestock, comprising a thermally bonded fiber mat layer having a surface hardness (Durometer hardness) of 60 to 98 by an F-type hardness tester and having a water permeability of not more than 120 seconds.

2. A floor mat for livestock according to claim 1, wherein said thermally bonded fiber mat layer is made of a fiber mainly containing natural fiber, inorganic fiber, regenerated fiber, or synthetic fiber.

3. A floor mat for livestock according to claim 2, wherein the synthetic fiber constituting said thermally bonded fiber mat layer mainly contains polyester fiber or polyolefin fiber.

4. A floor mat for livestock according to claim 3, wherein said synthetic fiber is polyester staple fiber having a fineness of 1.5 to 100 deniers.

5. A floor mat for livestock according to claim 1, wherein fibers that form said thermally bonded fiber mat layer are given crimps.

6. A floor mat for livestock according to claim 5, wherein the number of said crimps is 5 to 30 per inch.

7. A floor mat for livestock according to claim 1, wherein said thermally bonded fiber mat layer has a mildew-proofing property and/or an antibacterial activity.

8. A floor mat for livestock according to claim 7, wherein said thermally bonded fiber mat layer contains 10 to 80% by weight of mildew-proofing fiber and/or antibacterial fiber.

9. A floor mat for livestock according to claim 1, wherein said thermally bonded fiber mat layer contains 20 to 60% by weight of thermally bondable fiber.

10. A floor mat for livestock according to claim 9, wherein said thermally bondable fiber is a core-sheath type fiber containing 30 to 70% by weight of a sheath component having a melting point of 70 to 200° C.

11. A floor mat for livestock according to claim 1, wherein said thermally bonded fiber mat layer is composed of a plurality of layers with reinforcing base cloth disposed therebetween.

12. A floor mat for livestock according to claim 11, wherein said base cloth is a woven fabric made of natural fiber, inorganic fiber, regenerated fiber, or synthetic fiber, or a film.

13. A floor mat for livestock according to claim 1, further comprising a mat cover made of woven or knitted fabric having a milder-proofing property and/or an antibacterial activity.

14. A floor mat for livestock according to claim 1, wherein fibers that form said thermally bonded fiber mat layer have a solid, hollow, or non-circular cross-section.

15. A floor mat for livestock according to claim 1, wherein said thermally bonded fiber mat layer has a mildew-proofing property and/or an antibacterial activity and contains 20 to 60% by weight of thermally bondable fiber, with base cloth disposed between a plurality of said thermally bonded fiber mat layers.

16. A floor mat for livestock according to claim 15, wherein said thermally bonded fiber mat layer is made of synthetic fiber mainly containing polyester fiber or polyolefin fiber, has a thickness of 1 to 40 mm, and further comprises a mat cover of woven or knitted fabric having a mildew-proofing property and/or an antibacterial activity.

* * * * *